US006640689B2

(12) United States Patent
Mitsui et al.

(10) Patent No.: US 6,640,689 B2
(45) Date of Patent: Nov. 4, 2003

(54) DOUBLE-RACK-AND-PINION SWINGING APPARATUS

(75) Inventors: Kaichiro Mitsui, Ibaraki (JP); Mitsunori Magaribuchi, Ibaraki (JP); Naoki Hama, Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/106,347

(22) Filed: Mar. 27, 2002

(65) Prior Publication Data

US 2002/0152826 A1 Oct. 24, 2002

(30) Foreign Application Priority Data

Apr. 10, 2001 (JP) ...................................... 2001-111674

(51) Int. Cl.[7] ................................................ F16H 19/04
(52) U.S. Cl. ................................ 92/68; 92/136; 92/138
(58) Field of Search ............................. 92/136, 22, 68, 92/138, 163

(56) References Cited

U.S. PATENT DOCUMENTS 3,019,771 A * 2/1962 Heese et al. .................. 92/136
3,104,589 A * 9/1963 Rudd .......................... 92/136
4,545,288 A * 10/1985 Burke .......................... 92/136
6,170,384 B1 * 1/2001 Stoll et al. .................... 92/136

* cited by examiner

*Primary Examiner*—Edward K. Look
*Assistant Examiner*—Thomas E. Lazo
(74) *Attorney, Agent, or Firm*—Oblon, Spivak, McClelland, Maier & Neustadt, P.C.

(57) ABSTRACT

In air flow paths of a swinging apparatus in which racks are respectively provided to pistons of a pair for swinging in cylinder bores of a pair disposed in parallel in a casing, a pinion is engaged with the racks, and the pistons of the pair are synchronously driven in opposite directions to each other by synchronously supplying and discharging pressure air to and from opposite ends to each other of the pistons of the pair, the air flow paths for supplying and discharging the pressure air to and from opposite ends to each other of the pistons of the pair are formed between a bottom of the casing and a flow path forming member mounted to the bottom.

14 Claims, 2 Drawing Sheets

DOUBLE-RACK-AND-PINION SWINGING APPARATUS

TECHNICAL FIELD

The present invention relates to a double-rack-and-pinion swinging apparatus.

PRIOR ART

A double-rack-and-pinion swinging apparatus has merits of an increase in working torque and absorption of backlash of a gear portion at a swinging end by applying air pressure such that pistons of a pair and facing each other are actuated in opposite directions to each other.

A perspective view showing an outward appearance of a prior-art double-rack-and-pinion swinging apparatus is shown in FIG. 3 and a conceptual rendering showing a structure of the apparatus is shown in FIG. 4.

In the swinging apparatus 31, first and second cylinder bores 33 and 34 of a pair are provided in parallel in a casing 32, first and second pistons 35 and 36 of a pair are housed for sliding in the cylinder bores, racks 35*a* and 36*a* are respectively provided to the respective pistons, and a pinion 37 is engaged with the racks. In the first cylinder bore 33 and the second cylinder bore 34, first pressure chambers 33*a* and 34*a* and second pressure chambers 33*b* and 34*b* into and from which pressure air is supplied and discharged are formed respectively on opposite sides of the pistons 35 and 36 of the pair.

To opposite ends of the casing 32, as shown in FIG. 3, end caps 41 and 42 are airtightly and detachably secured by a plurality of bolts 43 through sealing means 44 such as gaskets. Opposite ends of the cylinder bores 33 and 34 of the pair are closed with the end caps 41 and 42. In one end cap 41, first and second ports 45 and 46 for supplying and discharging pressure fluid to and from the pressure chambers 33*a*, 34*a*, 33*b*, and 34*b* in the first and second cylinder bores 33 and 34 are provided to directly communicate with the first pressure chambers 33*a* and 34*a*.

In the casing 32, as shown in FIG. 4, two air flow paths 51 and 52 respectively communicating with the first and second ports 45 and 46 are provided to axially pass through the casing 32. In the other end cap 42, two air flow paths 53 and 54 connected to the flow paths 51 and 52 are provided. The air flow paths 53 and 54 are formed of grooves provided to a surface of the end cap 42 and packing 55 for sealing is provided to peripheries of the grooves. The two air flow paths 53 and 54 are respectively connected to the second pressure chamber 34*b* in the second cylinder bore 34 and the second pressure chamber 33*b* in the first cylinder bore 33.

Therefore, pressure air supplied from the first port 45 flows into the first pressure chamber 33*a* in the first cylinder bore 33 and flows into the second pressure chamber 34*b* in the second cylinder bore 34 through the flow paths 51 and 53 to drive the pistons 35 and 36 in opposite directions to each other. At this time, air in the second pressure chamber 33*b* in the first cylinder bore 33 is discharged from the second port 46 through the flow paths 54 and 52 together with air in the first pressure chamber 34*a* in the second cylinder bore 34.

If pressure air is supplied from the second port 46, the air flows into the first pressure chamber 34*a* in the second cylinder bore 34 and flows into the second pressure chamber 33*b* in the first cylinder bore 33 through the flow paths 52 and 54 to drive the pistons 35 and 36 in opposite directions to those in the above case. At this time, air in the second pressure chamber 34*b* in the second cylinder bore 34 is discharged from the first port 45 through the flow paths 53 and 51 together with air in the first pressure chamber 33*a* in the first cylinder bore 33.

Therefore, the pressure air is synchronously supplied and discharged to and from opposite end portions to each other of the pistons 35 and 36 of the pair. As a result, the pistons 35 and 36 of the pair are synchronously driven in opposite directions to each other.

The swinging apparatus is used in various manners in which a swinging rotary table 49 is mounted to an output shaft of the pinion 37 engaged with the pair of racks to change an orientation of a workpiece with the table 49 or chuck arms are directly mounted to the pistons 35 and 36 of the pair to chuck the workpiece with the chuck arms.

In such a prior-art double-rack-and-pinion swinging apparatus, however, because the plurality of flow paths 51 and 52 are formed in the casing 32 to axially pass through the casing and are connected to the respective pressure chambers 33*b* and 34*b* by the flow paths 53 and 54 provided to the end cap 42, structures of the flow paths are complicated, lengths of the holes are long, and processing for making the holes is troublesome. Moreover, because it is necessary to obtain space, thicknesses, and the like taken up by the respective flow paths 51, 52, 53, and 54 in the casing 32 and the end cap 42, the casing 32 and the end cap 42 are upsized and it is difficult to miniaturize a product.

DISCLOSURE OF THE INVENTION

The present invention has been accomplished to solve such problems and it is technical objects of the present invention to simplify structures of air flow paths connecting respective ports and pressure chambers and to miniaturize a double-rack-and-pinion swinging apparatus.

To achieve the above objects, according to the present invention, there is provided a double-rack-and pinion apparatus comprising, a casing, a flow path forming member mounted to a bottom of the casing, a first cylinder bore and a second cylinder bore provided in parallel with each other in the casing, a first piston and a second piston for sliding in the cylinder bores, racks provided to the respective pistons and a pinion engaged with the racks, first pressure chambers and second pressure chambers formed respectively on opposite sides of the respective pistons, a first flow port and a second flow port for supplying pressure fluid to the respective pressure chambers, and a first flow path connecting the first pressure chamber on one end of the first piston and the second pressure chamber on one end of the second piston and a second flow path connecting the second pressure chamber on the other end of the first piston and the first pressure chamber on the other end of the second piston, the first and second flow paths being formed between the bottom of the casing and the flow path forming member.

In the double-rack-and-pinion swinging apparatus of the present invention having the above structure, because the first flow path connecting the first pressure chamber on one end of the first piston and the second pressure chamber on one end of the second piston and the second flow path connecting the second pressure chamber on the other end of the first piston and the first pressure chamber on the other end of the second piston are formed between the bottom of the casing and the flow path forming member mounted to the bottom, it is unnecessary to provide the air flow paths to the end cap and the long air flow paths provided to the casing and extending in the axial direction of the cylinder bores are unnecessary unlike the prior-art apparatus.

Therefore, according to the present invention, the end caps can be omitted and the long air flow paths provided to the casing and extending in the axial direction of the cylinder bores are unnecessary. As a result, structures of the flow paths of the double-rack and-pinion swinging apparatus are simple and the swinging apparatus can be miniaturized.

In the present invention, it is preferable that the first flow path and the second flow path are formed of a plurality of grooves provided to at least one of the bottom of the casing and a surface of the flow path forming member and that the grooves have packing for sealing the flow paths at peripheries of the grooves.

In the swinging apparatus, the casing includes a plurality of through holes connecting the bottom of the casing and the respective pressure chambers and the first flow path and the second flow path and the respective pressure chambers are connected to each other through the through holes.

In the swinging apparatus of the present invention, it is preferable that opposite ends of the first and second cylinder bores are respectively closed with plugs, that the first port is formed in the plug on one end of the first cylinder bore, and that the second port is formed in the plug on one end of the second cylinder bore.

DETAILED DESCRIPTION

Figure 1:
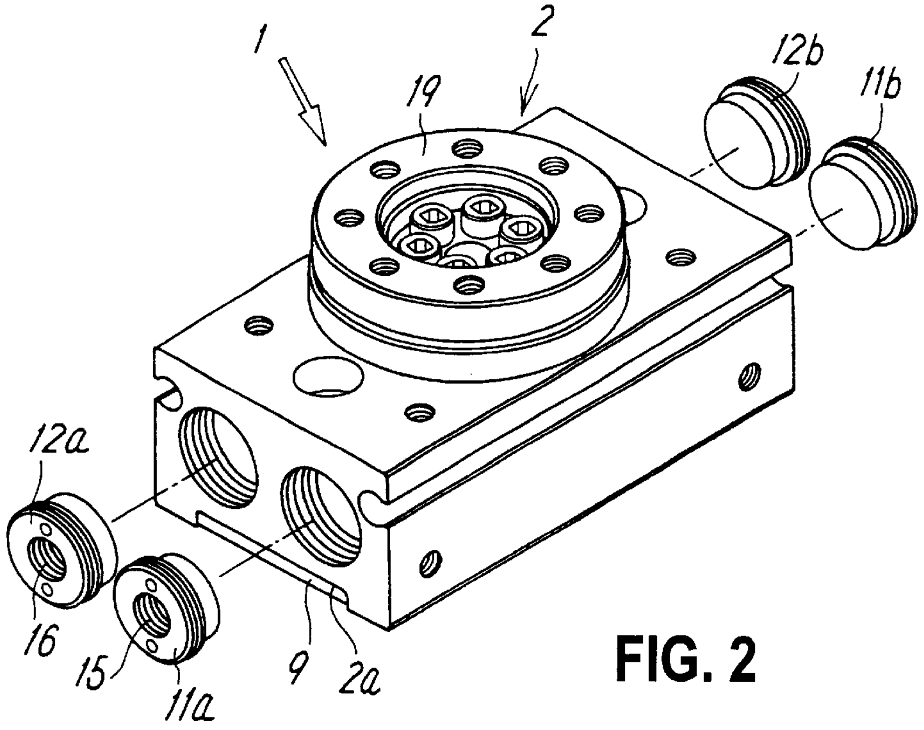
FIG. 1 is a perspective view of an outward appearance of an embodiment of a double-rack-and-pinion swinging apparatus according to the present invention.
Figure 2:
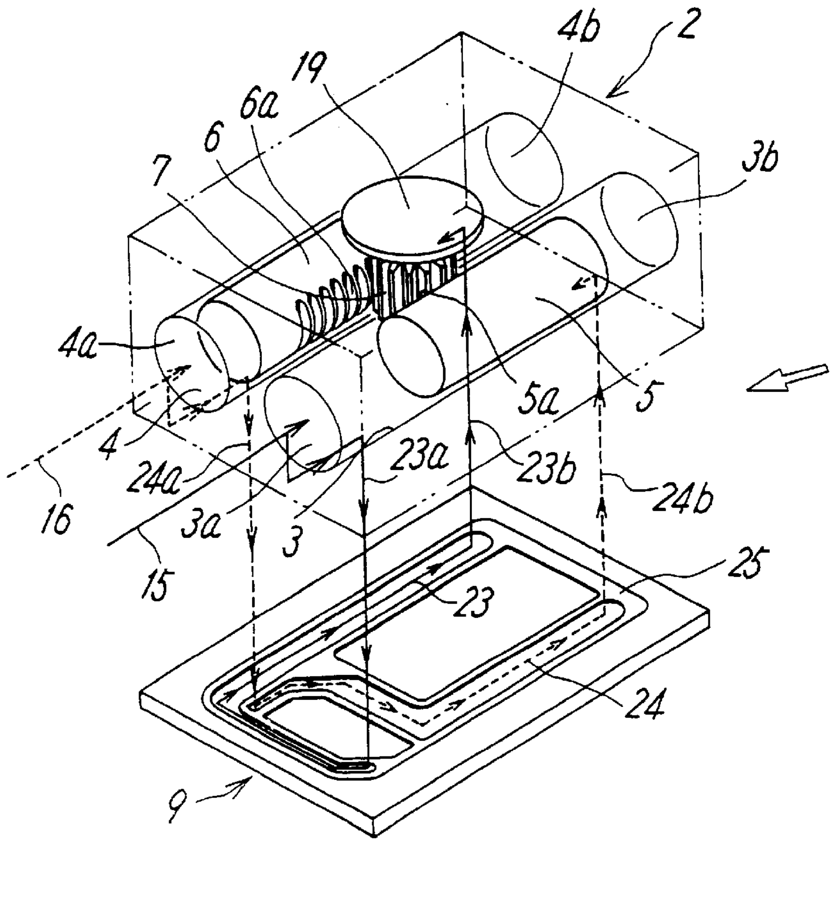
FIG. 2 is a conceptual rendering of a structure of the swinging apparatus.
Figure 3:
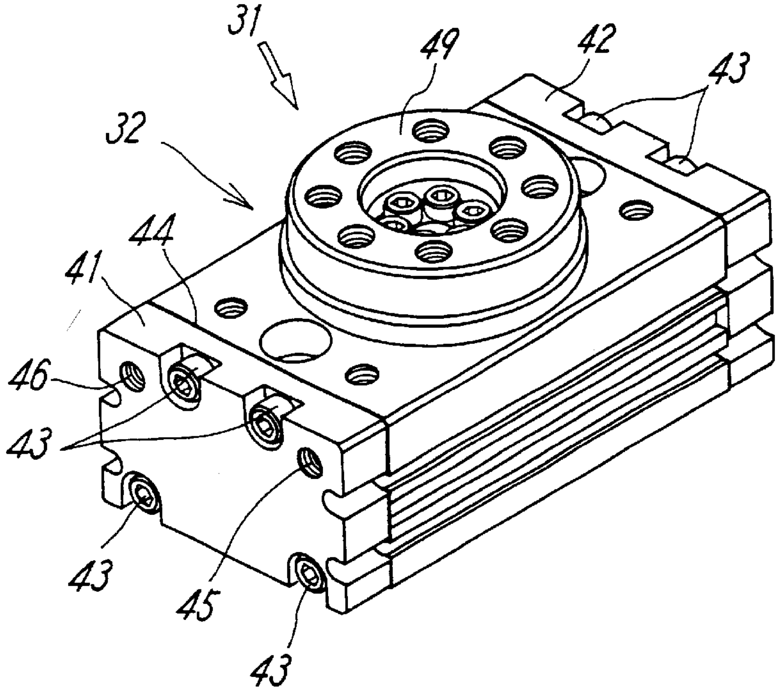
FIG. 3 is a perspective view of an outward appearance of a prior-art double-rack-and-pinion swinging apparatus.
Figure 4:
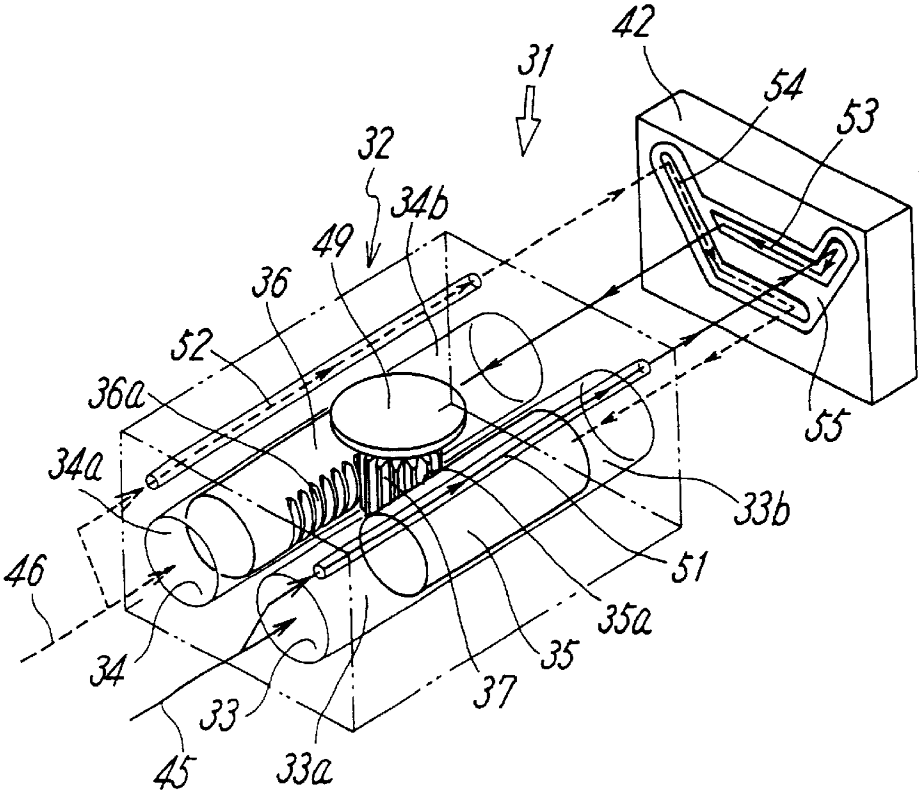
FIG. 4 is a conceptual rendering of a structure of the swinging apparatus.

FIGS. 1 and 2 show an embodiment of a double-rack and-pinion swinging apparatus according to the present invention. FIG. 1 is a perspective view showing an outward appearance of the apparatus and FIG. 2 is a conceptual rendering of a structure of the apparatus.

The swinging apparatus 1 includes first and second cylinder bores 3 and 4 of a pair and provided in parallel in a casing 2, first and second pistons 5 and 6 of a pair and for sliding in the respective cylinder bores, racks 5*a* and 6*b* formed by cutting cogs on side faces of intermediate portions of the respective pistons, and a pinion 7 engaged with the racks. By synchronously applying air pressure on end portions on opposite sides to each other of the pair of pistons 5 and 6, the pistons 5 and 6 are synchronously driven in opposite directions to each other.

To be more specific, the first cylinder bore 3 and the second cylinder bore 4 axially pass through the casing 2. Threads are formed respectively on inner peripheries of opposite end portions of the cylinder bores 3 and 4. By respectively engaging plugs 11*a*, 12*a*, 11*b*, and 12*b* having threads on their outer peripheries with the threads of the cylinder bores 3 and 4 through sealing members, the opposite ends of the respective cylinder bores 3 and 4 are closed airtightly. In the respective cylinder bores 3 and 4, first pressure chambers 3*a* and 4*a* and second pressure chambers 3*b* and 4*b* are formed respectively on opposite sides of the respective pistons 5 and 6.

At central portions of the plugs 11*a* and 12*a* with which one end portions of the respective cylinder bores 3 and 4 are closed, a first port 15 and a second port 16 are provided respectively. The respective ports 15 and 16 directly communicate with the first pressure chambers 3*a* and 4*a* of the cylinder bores 3 and 4 respectively and are formed such that pipes (not shown) for supplying and discharging pressure air can be connected to the ports 15 and 16.

The casing 2 has a section substantially in a shape of a rectangular parallelepiped and a thin plate-shaped flow path forming member 9 having such a length as to extend along axes of the cylinder bores 3 and 4 to opposite end portions of the cylinder bores 3 and 4 and such a width as to extend astride the two cylinder bores 3 and 4 is mounted to the whole or a part of a bottom of the casing 2. Between the flow path forming member 9 and the bottom of the casing 2, a first flow path 23 connecting the first pressure chamber 3*a* in the first cylinder bore 3 and the second pressure chamber 4*b* in the second cylinder bore 4 and a second flow path 24 connecting the first pressure chamber 4*a* in the second cylinder bore 4 and the second pressure chamber 3*b* in the first cylinder bore 3 are formed. The respective air flow paths 23 and 24 are formed of two grooves formed in a face of the flow path forming member 9 in contact with the casing 2 and packing 25 for airtightly defining the respective air flow paths 23 and 24 is provided to peripheries of the grooves.

In an example shown in FIG. 1, a groove 2*a* having a depth substantially the same as a thickness of the flow path forming member 9 is formed in an axial direction in the bottom of the casing 2 and the flow path forming member 9 is fitted and fixed into the groove 2*a* such that the flow path forming member 9 and the bottom of the casing are at substantially the same height. In an example shown in FIG. 2, the flow path forming member 9 substantially in the same size as the bottom of the casing 2 is mounted to the bottom of the casing 2. In this manner, the flow path forming member 9 is mounted to the bottom of the casing 2 in an arbitrary manner.

A space portion communicating with the pair of cylinder bores 3 and 4 is formed between the cylinder bores 3 and 4 at a central portion of the casing 2. The pinion 7 is housed in the space portion and engaged with the racks provided to the pair of pistons 5 and 6. By synchronously driving the pistons 5 and 6 in opposite directions to each other, the pinion 7 swings and rotates.

An output shaft (not shown) of the pinion 7 projects upward from an upper face of the casing 2 and a swinging rotary table 19 on which a workpiece is placed is mounted detachably to the output shaft.

Four through holes 23*a*, 23*b*, 24*a*, and 24*b* connecting the end portions of the respective cylinder bores 3 and 4 and the bottom of the casing 2 are opening in the bottom. Through the respective through holes, the respective pressure chambers 3*a*, 3*b*, 4*a*, and 4*b* communicate with the air flow paths 23 and 24 formed in the flow path forming member 9. Because the respective through holes linearly connect the bottom of the casing 2 and the respective cylinder bores 3 and 4, the through holes are short. Therefore, processing for making the holes is easy and the holes take up only small space.

If pressure air is supplied from the first port 15 into the first pressure chamber 3*a* in the first cylinder bore 3, the pressure air flows from the through hole 23*a* communicating with the pressure chamber 3*a* through the first flow path 23 and the through hole 23*b* into the second pressure chamber 4*b* in the second cylinder bore 4 to drive the first piston 5 toward the second pressure chamber 3*b* and drive the second piston 6 toward the first pressure chamber 4*a* as shown with arrows in solid lines in FIG. 2. At this time, air in the second pressure chamber 3*b* in the first cylinder bore 3 flows from the through hole 24*b* through the air flow path 24 and the through hole 24*a* into the first pressure chamber 4*a* in the second cylinder bore 4 and is discharged from the second port 16 together with air in the pressure chamber 4*a*.

If pressure air is supplied from the second port 16 into the first pressure chamber 4*a* in the second cylinder bore 4, the pressure air flows from the through hole 24*a* communicating with the pressure chamber 4*a* through the second flow path 24 and the through hole 24*b* into the second pressure chamber 3*b* in the first cylinder bore 3 to drive the first piston 5 toward the first pressure chamber 3*a* and drive the second piston 6 toward the second pressure chamber 4*b* as shown with arrows in broken lines in FIG. 2. At this time, air in the second pressure chamber 4*b* in the second cylinder bore 4 flows from the through hole 23*b* through the air flow path 23 and the through hole 23*a* into the first pressure chamber 3*a* in the first cylinder bore 3 and is discharged from the first port 15 together with air in the pressure chamber 3*a*.

Thus, by synchronously supplying and discharging the pressure air to and from the opposite end portions to each other of the pair of pistons 5 and 6, the pistons 5 and 6 of the pair are driven synchronously in opposite directions to each other. As a result, the pinion 7 and the swinging rotary table 19 swing and rotate and an orientation of the workpiece on the table 19 is changed.

Although the first and second flow paths 23 and 24 are connected to the first pressure chambers 3*a* and 4*a* in the first and second cylinder bores through the through holes 23*a* and 24*a* provided to the casing 2 in the embodiment shown in FIGS. 1 and 2, the apparatus is not necessarily limited to the embodiment. For example, it is also possible that the through holes 23*a* and 24*a* communicate with the ports 15 and 16 to thereby directly connect the first and second flow paths 23 and 24 to the ports 15 and 16.

Although the first and second flow paths 23 and 24 are formed of grooves provided to a surface of the flow path forming member 9 in the embodiment shown in FIGS. 1 and 2, the apparatus is not necessarily limited to the embodiment. It is also possible to form grooves as the air flow paths 23 and 24 on a bottom side of the casing 2. It is also possible to form grooves in positions facing each other on the bottom of the casing 2 and a surface of the flow path forming member 9 and to connect the grooves to thereby form the air flow paths 23 and 24.

Although the output shaft (not shown) of the pinion 7 projects from the upper face of the casing 2 and the swinging rotary table 19 on which the workpiece is placed is detachably mounted to the output shaft in the embodiment shown in FIGS. 1 and 2, the swinging apparatus of the present invention is not necessarily limited to such a structure. For example, it is possible to form the pistons 5 and 6 of the pair as open/close chucks by mounting chuck arms to the respective pistons 5 and 6 such that the chuck arms chuck the workpiece. An arbitrary structure can be employed here.

By forming the air flow paths 23 and 24 connecting the pressure chambers 3*a* and 4*b*, 3*b* and 4*a* in the two cylinder bores 3 and 4 between the bottom of the casing 2 and the flow path forming member 9 mounted to the bottom and connecting the air flow paths 23 and 24 and the respective pressure chambers 3*a*, 3*b*, 4*a*, and 4*b* through the short through holes 23*a*, 23*b*, 24*a*, and 24*b* provided between the bottom of the casing 2 and the respective pressure chambers, structures of the flow paths are simple, the processing for making the holes is easy because the holes formed in the casing can be short, and it is unnecessary to obtain a large area, a large thickness, or the like of the casing to provide the respective flow paths as compared with a prior-art apparatus in which a plurality of air flow paths are provided to axially pass through a casing and are also provided to an end cap.

Therefore, the end caps with large thicknesses can be omitted and the plurality of long air flow paths extending in the axial direction of the cylinder bores do not need to be provided to the casing. As a result, the swinging apparatus can be miniaturized.

As described above in detail, according to the present invention, because the air flow paths connecting the pressure chambers in the two cylinder bores are formed between the bottom of the casing and the flow path forming member mounted to the bottom and the air flow paths and the respective pressure chambers are connected by the short through holes provided between the bottom of the casing and the respective pressure chambers, the structures of the flow paths are simple, the structure of the casing is simple, the processing for making the holes is easy, and the double-rack-and-pinion swinging apparatus can be miniaturized.

What is claimed is:

1. A double-rack-and-pinion apparatus comprising:

a casing; a first cylinder bore and a second cylinder bore provided in parallel with each other in said casing; a flow path forming member mounted to a bottom of said casing, said flow path forming member being oriented substantially parallel to said first and second cylinder bores; a first piston and a second piston for sliding in said cylinder bores; racks provided to said respective pistons and a pinion engaged with said racks; first pressure chambers and second pressure chambers formed respectively on opposite ends of said respective pistons; a first port and a second port for supplying pressure fluid to said respective pressure chambers; and a first flow path connecting said first pressure chamber on one end of said first piston and said second pressure chamber on one end of said second piston and a second flow path connecting said second pressure chamber on the other end of said first piston and said first pressure chamber on the other end of said second piston, said first and second flow paths being formed between said bottom of said casing and said flow path forming member.

2. The apparatus according to claim 1, wherein said first flow path and said second flow path are formed by a plurality of airtight grooves provided to at least one of said bottom of said casing and a surface of said flow path forming member.

3. The apparatus according to claim 2, wherein opposite ends of said first and second cylinder bores are respectively closed with plugs, said first port is formed in said plug on one end of said first cylinder bore, and said second port is formed in said plug on one end of said second cylinder bore.

4. The apparatus according to claim 1, wherein said casing further comprises a plurality of holes through said bottom of said casing connecting said respective pressure chambers and said first flow path and said second flow path.

5. The apparatus according to claim 4, wherein opposite ends of said first and second cylinder bores are respectively closed with plugs, said first port is formed in said plug on one end of said first cylinder bore, and said second port is formed in said plug on one end of said second cylinder bore.

6. The apparatus according to claim 4, wherein said plurality of holes communicate between each one of said pressure chambers and said bottom of said casing on a straight line.

7. The apparatus according to claim 1, wherein opposite ends of said first and second cylinder bores are respectively closed with plugs, said first port is formed in said plug on one end of said first cylinder bore, and said second port is formed in said plug on one end of said second cylinder bore.

8. The apparatus according to claim 1, wherein said flow path forming member has a length substantially the same as the lengths of said first and second cylinder bores and a width substantially equal to a combined width of both said first and second cylinder bores.

9. A double-rack-and-pinion apparatus comprising:

a casing; a first cylinder bore and a second cylinder bore provided in parallel with each other in said casing; a flow path forming member mounted to a bottom of said casing, said flow path forming member being oriented substantially parallel to said first and second cylinder bores; a first piston and a second piston for sliding in said cylinder bores; racks provided to said respective pistons and a pinion engaged with said racks; first pressure chambers and second pressure chambers formed respectively on opposite sides of said respective pistons; a first port and a second port for supplying pressure fluid to said respective pressure chambers; a plurality of holes through said bottom of said casing connecting said respective pressure chambers and said bottom of said casing; and a first flow path connecting said first pressure chamber on one end of said first piston and said second pressure chamber on one end of said second piston through at least two of said plurality holes and a second flow path connecting said second pressure chamber on the other end of said first piston and said first pressure chamber on the other end of said second piston through at least two additional holes said plurality of holes, said first and second flow paths being formed of a plurality of grooves provided to at least one of said bottom of said casing and said flow path forming member.

10. The apparatus according to claim 9, wherein opposite ends of said first and second cylinder bores are respectively closed with plugs, said first port is formed in said plug on one end of said first cylinder bore, and said second port is formed in said plug on one end of said second cylinder bore.

11. The apparatus according to claim 9, wherein said flow path forming member has a length substantially the same as the lengths of said first and second cylinder bores and a width substantially equal to a combined width of both said first and second cylinder bores.

12. The apparatus according to claim 9, wherein said plurality of holes communicate between each one of said pressure chambers and said bottom of said casing on a straight line.

13. A double-rack-and-pinion apparatus comprising:

a casing; a flow path forming member mounted to a bottom of said casing; a first cylinder bore and a second cylinder bore provided in parallel with each other in said casing; a first piston and a second piston for sliding in said cylinder bores; racks provided to said respective pistons and a pinion engaged with said racks; first pressure chambers and second pressure chambers formed respectively on opposite sides of said respective pistons; a first port and a second port for supplying pressure fluid to said respective pressure chambers; and a first flow path connecting said first pressure chamber on one end of said first piston and said second pressure chamber on one end of said second piston and a second flow path connecting said second pressure chamber on the other end of said first piston and said first pressure chamber on the other end of said second piston, said first and second flow paths being formed between said bottom of said casing and said flow path forming member, wherein opposite ends of said first and second cylinder bores are respectively closed with plugs, said first port is formed in said plug on one end of said first cylinder bore, and said second port is formed in said plug on one end of said second cylinder bore.

14. A double-rack-and-pinion apparatus comprising:

a casing; a flow path forming member mounted to a bottom of said casing; a first cylinder bore and a second cylinder bore provided in parallel with each other in said casing; a first piston and a second piston for sliding in said cylinder bores; racks provided to said respective pistons and a pinion engaged with said racks; first pressure chambers and second pressure chambers formed respectively on opposite sides of said respective pistons; a first port and a second port for supplying pressure fluid to said respective pressure chambers; a plurality of through holes connecting said respective pressure chambers and said bottom of said casing; and a first flow path connecting said first pressure chamber on one end of said first piston and said second pressure chamber on one end of said second piston through said through hole and a second flow path connecting said second pressure chamber on the other end of said first piston and said first pressure chamber on the other end of said second piston through said through hole, said first and second flow paths being formed of a plurality of grooves provided to at least one of said bottom of said casing and said flow path forming member, wherein opposite ends of said first and second cylinder bores are respectively closed with plugs, said first port is formed in said plug on one end of said first cylinder bore, and said second port is formed in said plug on one end of said second cylinder bore.

* * * * *